United States Patent
Furui (10) Patent No.: US 10,860,144 B2
(45) Date of Patent: Dec. 8, 2020

(54) PROJECTOR AND METHOD FOR CONTROLLING PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/899,859

(22) Filed: Feb. 20, 2018

(65) Prior Publication Data

US 2018/0246618 A1    Aug. 30, 2018

(30) Foreign Application Priority Data

Feb. 24, 2017    (JP) .................................. 2017-033042

(51) Int. Cl.
*G06F 3/042*    (2006.01)
*G06F 3/0481*    (2013.01)
*G06F 3/041*    (2006.01)

(52) U.S. Cl.
CPC .......... *G06F 3/0425* (2013.01); *G06F 3/0416* (2013.01); *G06F 3/04817* (2013.01); *G06F 3/04812* (2013.01)

(58) Field of Classification Search
CPC .. G06F 3/0416; G06F 3/0425; G06F 3/04812; G06F 3/04817
See application file for complete search history.

(56) References Cited

U.S. PATENT DOCUMENTS

| 2009/0015730 | A1  | 1/2009  | Arakawa |
| 2011/0169746 | A1* | 7/2011  | Kitajima ............... G06K 9/2036 345/173 |
| 2011/0169776 | A1* | 7/2011  | Ouchi ................... G06F 3/0425 345/175 |
| 2011/0216236 | A1* | 9/2011  | Kasahara ............... G03B 17/54 348/370 |
| 2011/0243380 | A1* | 10/2011 | Forutanpour ........... G06F 3/017 382/103 |
| 2012/0098865 | A1* | 4/2012  | Takano .................. G03B 21/26 345/660 |
| 2012/0127074 | A1* | 5/2012  | Nakamura ............ G06F 3/0425 345/158 |
| 2013/0127716 | A1  | 5/2013  | Nagashima |
| 2013/0307773 | A1* | 11/2013 | Yagishita .............. G06F 3/0425 345/158 |

(Continued)

FOREIGN PATENT DOCUMENTS

| JP | 2005-141151 A | 6/2005 |
| JP | 2007-215029 A | 8/2007 |

(Continued)

*Primary Examiner* — Amare Mengistu
*Assistant Examiner* — Jennifer L Zubajlo
(74) *Attorney, Agent, or Firm* — Oliff PLC (57) ABSTRACT

A projector includes a projection section that projects a projection image on a projection surface, a display control section that displays a marker on the projection image, an imaging section that captures an image of the projection surface to produce a captured image, a detection section that detects a change in the position of the marker based on the captured image, and a processing section that carries out a predetermined process when the change in the position of the marker is detected.

7 Claims, 8 Drawing Sheets

(56) References Cited

U.S. PATENT DOCUMENTS

| | | | | |
|---|---|---|---|---|
| 2013/0322785 A1* | 12/2013 | Kamamori | ............. | G06T 11/60 382/311 |
| 2014/0300747 A1* | 10/2014 | Krishnakumar | ....... | H04N 5/232 348/164 |
| 2015/0243016 A1* | 8/2015 | Moteki | .................... | G06T 7/70 382/103 |
| 2017/0223279 A1* | 8/2017 | Mueller | .................... | G06T 7/80 |
| 2018/0352205 A1* | 12/2018 | Kotani | .................... | G09G 5/00 |

FOREIGN PATENT DOCUMENTS

| | | | |
|---|---|---|---|
| JP | 2011-129068 A | 6/2011 | |
| JP | 2012-32465 A | 2/2012 | |
| JP | 2013-257861 A | 12/2013 | |

* cited by examiner

PROJECTOR AND METHOD FOR CONTROLLING PROJECTOR

BACKGROUND

1. Technical Field

The present invention relates to a projector and a method for controlling the projector.

2. Related Art

JP-A-2011-129068 describes a display control system that detects a user's operation performed on an icon image projected on a projection surface and carries out a predetermined process in accordance with a result of the detection. In the display control system, a projector projects an icon image on the projection surface, a camera captures an image of the projection surface to produce a captured image, and a process controller detects the user's operation performed on the icon image on the basis of the captured image. The process controller stores a captured image captured when the user does not operate the icon image as an initial state and determines that the user has performed the operation when the difference between the captured image in the initial state and an image captured afterward is greater than a threshold.

In a situation in which the user does not operate the icon image with a finger or any other operation element, the icon image is projected on the projection surface. The captured image in the initial state therefore shows the icon image reflected off the projection surface.

On the other hand, in a situation in which the user operates the icon image with the operation element, the operation element is present between the projector and the projection surface, so that the icon image is projected on the operation element. A captured image in the situation described above (hereinafter also referred to as "operation capturing image") therefore shows the icon image reflected off the operation element.

Therefore, between the captured image in the initial state and the operation capturing image, there is a change in luminance resulting from the different in reflection characteristic between the projection surface and the operation element and the difference in the shape therebetween. The process controller described in JP-A-2011-129068 evaluates whether or not the user has performed the operation on the basis of the change in luminance.

However, in a case where the operation element has a reflection characteristic similar to that of the projection surface (for example, in a case where the projection surface is a white screen and the operation element is a flat object, such as a palm or a white sheet of paper, and has high reflectance), the difference in luminance is small between the captured image in the initial state and the operation capturing image, so that the operation performed on the icon image cannot be detected in some cases. In such cases, even when the user operates the icon image, the predetermined process according to the operation is not undesirably carried out.

SUMMARY

An advantage of some aspects of the invention is to provide a technology that is used in a situation in which an operation element with which a marker is operated, such as an icon, has a reflection characteristic similar to that of a projection surface and avoids a situation in which a predetermined process is not carried out when the marker is operated with the operation element.

A projector according to an aspect of the invention includes a projection section that projects a projection image on a projection surface, a display control section that displays a marker on the projection image, an imaging section that captures an image of the projection surface to produce a captured image, a detection section that detects a change in a position of the marker based on the captured image, and a processing section that carries out a predetermined process when the change in the position of the marker is detected.

When a user operates the marker displayed on the projection surface with an operation element, such as a palm, the marker is projected on the operation element located in a position shifted from the projection surface toward the projection section, and the imaging section captures an image of the marker reflected off the operation element.

Since the optical axis of the projection section does not coincide with the optical axis of the imaging section (parallax is present between two axes), in the captured image produced by the imaging section, the position of the marker in a case where the marker is operated with the operation element differs from the position of the marker in a case where the marker is not operated with the operation element.

According to this aspect, the predetermined process is carried out in the case where the position of the marker changes. Therefore, even in a situation in which the operation element, with which the marker is operated, has a reflection characteristic similar to that of the projection surface, a situation in which the predetermined process is not carried out when the marker is operated with the operation element can be avoided.

In the projector according to the aspect described above, it is preferable that the display control section displays the marker in plurality in the projection image.

According to the aspect with this configuration, a situation in which the predetermined process is not carried out when any of the markers is operated with the operation element can be avoided.

In the projector according to the aspect described above, it is preferable that the display control section displays the markers in the projection image along an edge that is one of edges of the projection image and parallel to a vertical direction.

According to the aspect with this configuration, the plurality of markers can be so displayed in the projection image that the user readily operates the plurality of markers.

In the projector according to the aspect described above, it is preferable that in a case where the position of any one of the plurality of markers changes, the processing section carries out a process corresponding to the marker having changed in terms of position as the predetermined process, and that in a case where the positions of the plurality of markers change at the same time, the processing section does not carry out the predetermined process.

The situation in which the positions of the plurality of markers change at the same time does not occur in a situation in which the user operates the markers but may occur in a situation in which the user moves across the side in front of the plurality of markers, a situation in which the user wrongly operates the markers, or a situation in which the angle between the projector and the projection surface changes. Therefore, according to the aspect with the configuration described above, the predetermined process is not allowed to be carried out in a case where the user has no intention of operating any of the markers.

In the projector according to the aspect described above, it is preferable that, in a case where the position of the marker changes in a specific direction, the processing section carries out the predetermined process.

Since the optical axis of the projection section does not coincide with the optical axis of the imaging section (parallax is present between two axes), when the marker is operated with the operation element, the position of the marker on the captured image changes in the specific direction (direction in which optical axis of projection section and optical axis of imaging section are shifted from each other). Therefore, according to the aspect with the configuration described above, the predetermined process can be carried out in accordance with operation of the marker performed by the operation element.

In the projector according to the aspect described above, it is preferable that, in a case where the position of the marker changes by an amount greater than a predetermined amount, the processing section carries out the predetermined process.

According to the aspect with this configuration, the predetermined process is not allowed to be carried out in response, for example, to temporary vibration.

A method for controlling a projector according to another aspect of the invention includes projecting a projection image on a projection surface, displaying a marker on the projection image, capturing an image of the projection surface to produce a captured image, detecting a change in a position of the marker based on the captured image, and carrying out a predetermined process when the change in the position of the marker is detected.

According to the aspect described above, even in a situation in which the operation element, with which the marker is operated, has a reflection characteristic similar to that of the projection surface, a situation in which the predetermined process is not carried out when the marker is operated with the operation element can be avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment according to the invention will be described below with reference to the drawings. In the drawings, the dimension and scale of each portion differ from actual values as appropriate. The embodiment described below is a preferable specific example of the invention. A variety of technically preferable restrictions are therefore imposed on the embodiment. The scope of the invention is, however, not limited to the restricted forms unless otherwise particularly stated in the following description that a restriction is imposed on the invention.

First Embodiment

Figure 1:
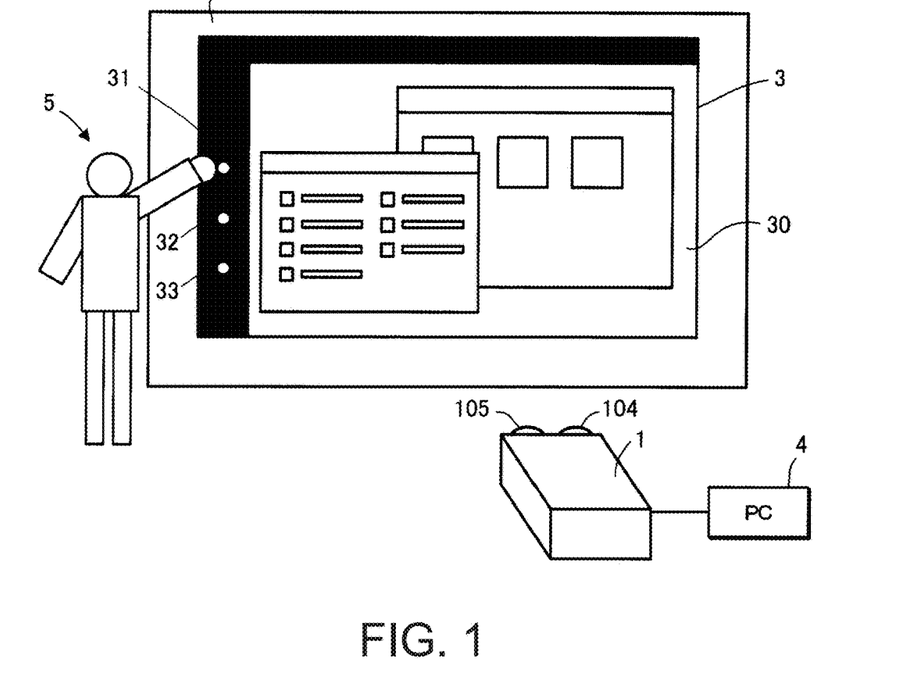
FIG. 1 shows a projector according to a first embodiment to which the invention is applied.

FIG. 1 shows a projector 1 according to a first embodiment to which the invention is applied.

The projector 1 projects a projection image 3 on a projection surface 2 via a projection section 104. The projection surface 2 is, for example, a screen or a wall. The projector 1 causes an imaging section 105 to repeatedly capture an image of the projection surface 2 to produce time-series captured images.

The projection image 3 includes an image 30 and icons 31 to 33. The image 30 is an image according to image information that the projector 1 has received from a PC (personal computer) 4. The PC 4 is an example of an image information output apparatus.

The icons 31 to 33 are each an example of a marker. A specific function is related to each of the icons 31 to 33. The projector 1 uses captured images generated on the time series to detect operation performed by a user 5 on any of the icons 31 to 33. Specifically, the projector 1 detects operation performed by the user 5, such as operation of holding a hand or any other body portion to block the projection of any of the icons 31 to 33 onto the projection surface 2. In the present embodiment, the projector 1 detects operation performed by the user 5 on any of the icons 31 to 33 on the basis of a change in the position of the icon on the captured images. The projector 1, when it detects operation performed by the user 5 on any of the icons 31 to 33, performs a function related to the operated icon.

Figure 2:
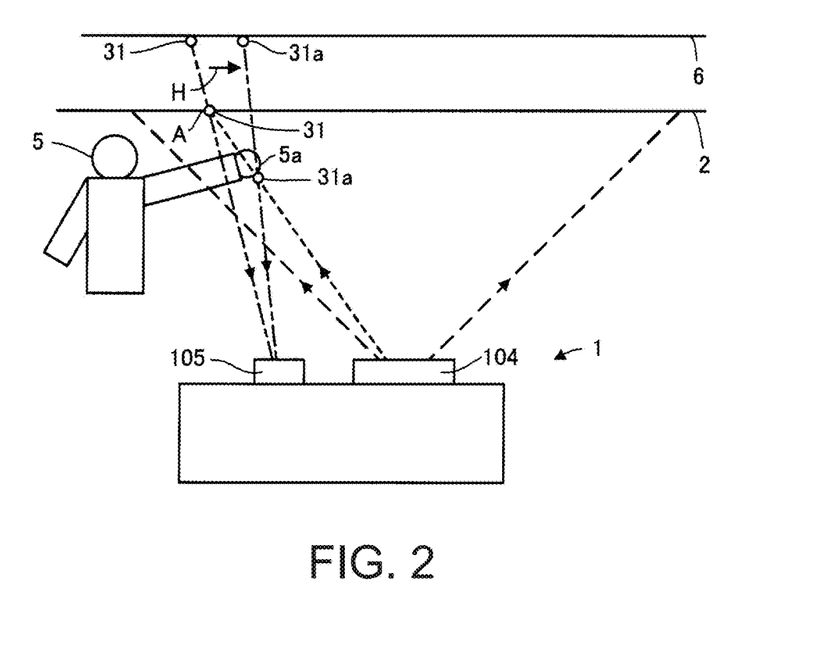
FIG. 2 describes a change in the projected position of an icon.

FIG. 2 describes how the projected position of the icon 31 changes when the user 5 operates the icon 31. In FIG. 2, the icon 31 is shown three-dimensionally for ease of the description but is not a three-dimensional object. How the projected position of the icon 31 changes when the user 5 operates the icon 31 also applies to how the projected position of the icon 32 or 33 changes, and the latter will therefore be not described.

In a case where the user 5 does not operate the icon 31, the icon 31 is displayed in a position A on the projection surface 2. In the situation, when the user 5 operates the icon 31 with a hand 5a, which is an example of an operation element, the hand 5a is located between the position A and the projection section 104. The icon 31 is therefore projected on the hand 5a instead of the projection surface 2. The icon 31 projected on the hand 5a is hereinafter also referred to as an "icon 31a," as shown in FIG. 2.

The optical axis of the projection section 104 does not coincide with the optical axis of the imaging section 105 (parallax is present between two axes), and the icon 31 projected in the position A and the icon 31a projected on the hand 5a are therefore displayed in different positions on a captured image 6 produced by the imaging section 105.

Figure 3:
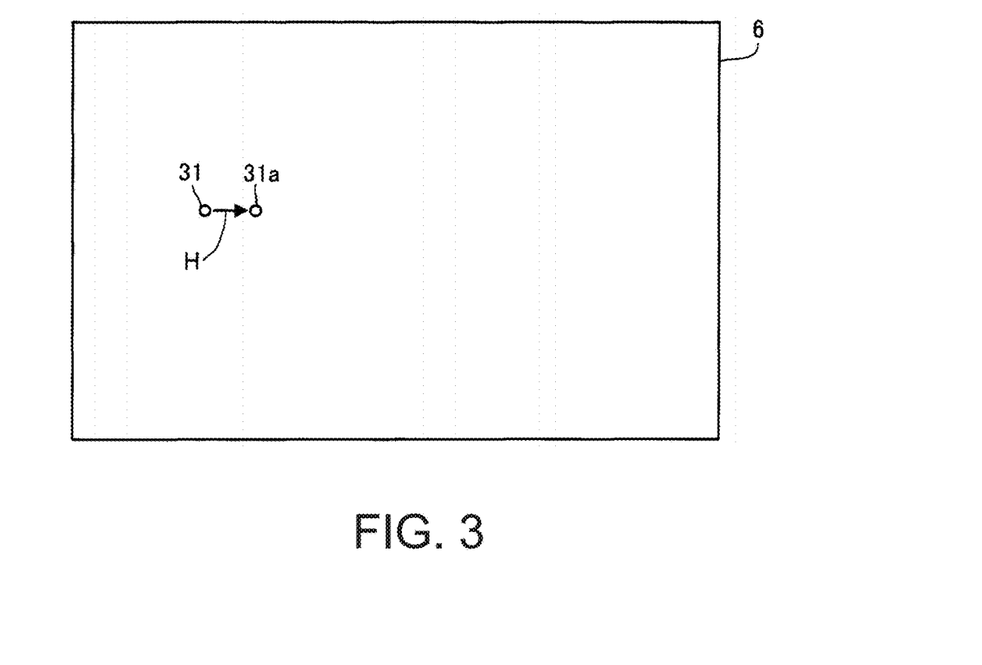
FIG. 3 describes a change in the position of the icon on a captured image.

Therefore, when the state in which the user 5 does not operate the icon 31 changes to the state in which the user 5 operates the icon 31, the position of the icon 31 moves in a direction H on the captured image 6, as shown in FIGS. 2 and 3. The direction H coincides with the direction in which the optical axis of the projection section 104 and the optical axis of an imaging section 105 are shifted from each other.

Figure 4:
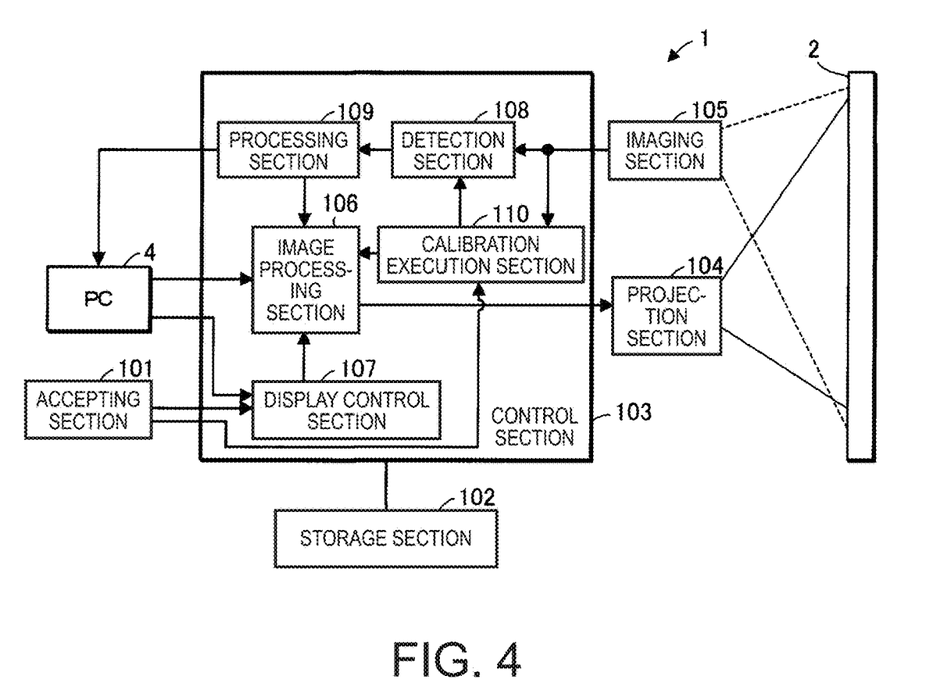
FIG. 4 diagrammatically shows the projector.

FIG. 4 diagrammatically shows the projector 1. The projector 1 includes an accepting section 101, a storage section 102, a control section 103, the projection section 104, and the imaging section 105.

The accepting section 101 is, for example, a variety of operation buttons or operation keys or a touch panel. The accepting section 101 accepts operation inputted by the user 5.

For example, the accepting section 101 accepts display instruction input operation that instructs display of the icons 31 to 33. Having accepted the display instruction input operation, the accepting section 101 outputs the display instruction to the control section 103. The accepting section 101 further accepts power-on operation and calibration start operation. Having accepted the power-on operation or the calibration start operation, the accepting section 101 outputs the calibration start instruction to the control section 103. The accepting section 101 further receives termination instruction input operation that instructs termination of icon operation. Having accepted the termination instruction input operation, the accepting section 101 outputs the termination instruction to the control section 103.

The accepting section 101 may, for example, be a remote control that transmits information according to input operation wirelessly or via a wire. In this case, the projector 1 includes a receiver that receives the information transmitted by the remote control. The remote control includes a variety of operation buttons or operation keys or a touch panel that accepts input operation.

The storage section 102 is a computer readable recording medium. The storage section 102 stores a program that defines the action of the projector 1 and a variety of pieces of information.

The control section 103 is a computer, such as a CPU (central processing unit). The control section 103 reads and executes the program stored in the storage section 102 to achieve an image processing section 106, a display control section 107, a detection section 108, a processing section 109, and a calibration execution section 110. In FIG. 4, signal lines that connect the components in the control section 103 to the storage section 102 are omitted.

The image processing section 106 performs image processing on image information (hereinafter also referred to as "received image information") received from the PC 4 to produce an image signal.

The display control section 107 controls the operation of displaying the projection image 3. The display control section 107, when it accepts, for example, the display instruction (instruction of display of icons 31 to 33) from the accepting section 101, displays the icons 31 to 33 in the projection image 3. The icons 31 to 33 are an example of a plurality of markers. The display control section 107 may display the icons 31 to 33 in the projection image 3 even in a case where the display control section 107 has accepted no display instruction.

The display control section 107 outputs, for example, additional image information representing the icons 31 to 33 to the image processing section 106 to cause it to display the icons 31 to 33 in the projection image 3.

Figure 5:
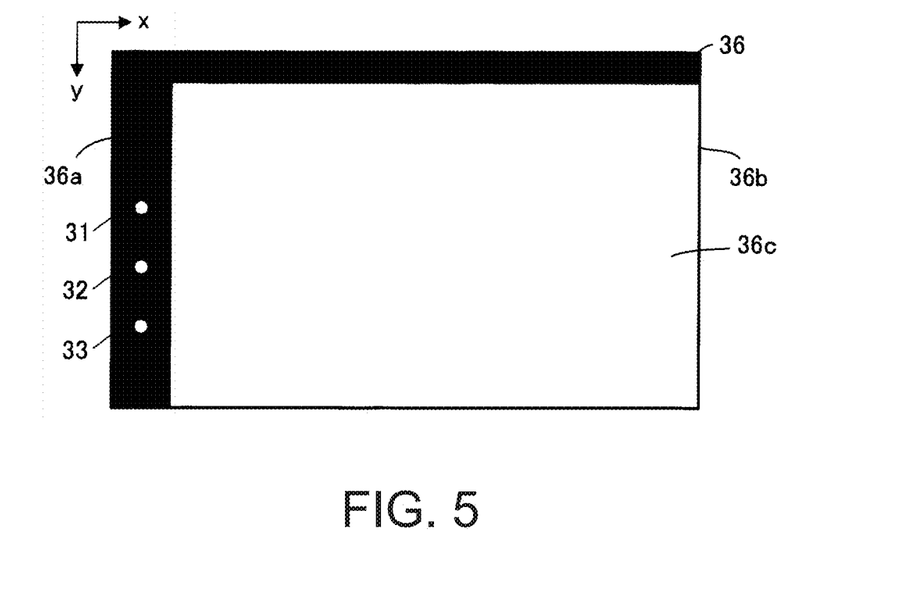
FIG. 5 shows an example of an additional image according to additional image information.
Figure 6:
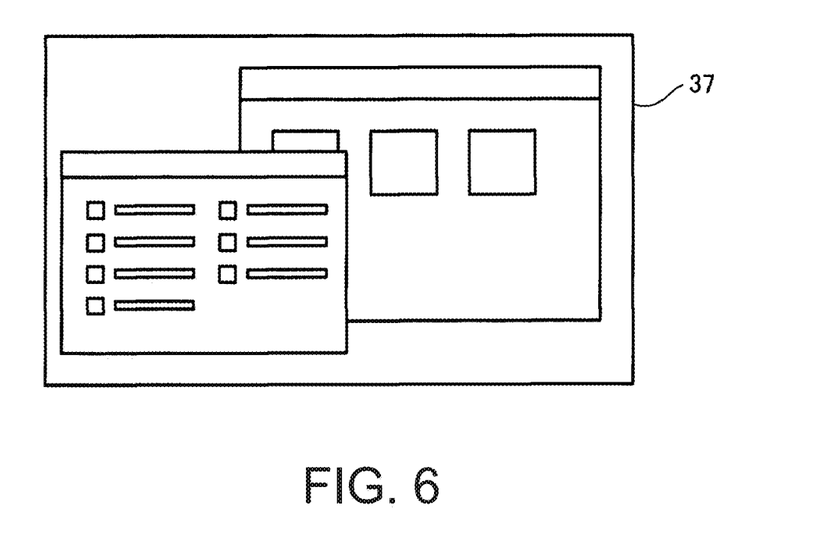
FIG. 6 shows an example of an image according to received image information.

FIG. 5 shows an example of an additional image 36 according to the additional image information. FIG. 6 shows an example of an image 37 according to the received image information.

For example, in a case where the additional image information represents the additional image 36 shown in FIG. 5 and the received image information represents the image 37 shown in FIG. 6, the image processing section 106 combines the additional image information with the received image information to produce an image signal representing the projection image 3, in which the image 37 is incorporated into an area 36c of the additional image 36 (see FIG. 1). The additional image information is stored in the storage section 102, and the display control section 107 reads the additional image information from the storage section 102.

The projection section 104 projects the projection image 3 onto the projection surface 2.

Figure 7:
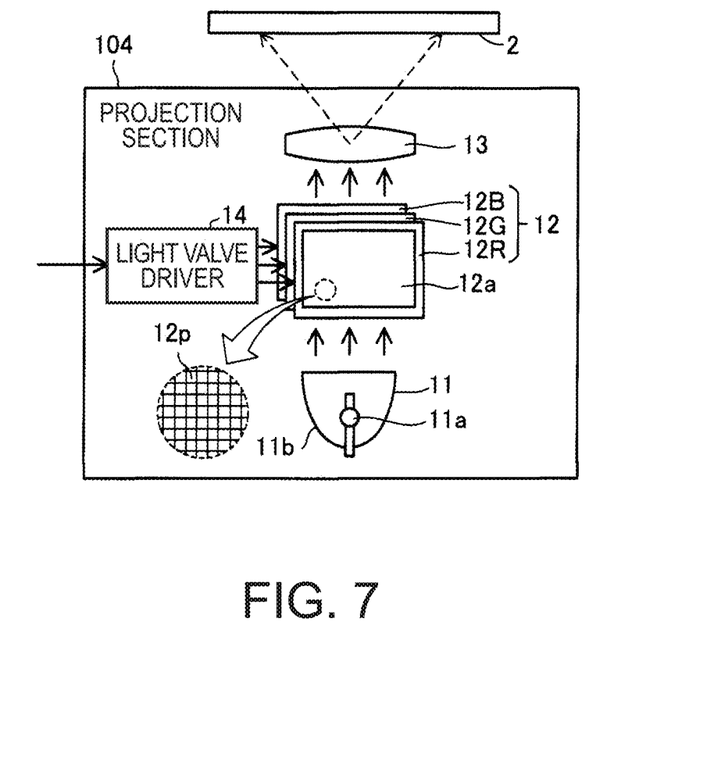
FIG. 7 shows an example of a projection section.

FIG. 7 shows an example of the projection section 104. The projection section 104 includes a light source 11, three liquid crystal light valves 12 (12R, 12G, and 12B), which are an example of a light modulator, a projection lens 13, which is an example of a projection system, a light valve driver 14, and other components. The projection section 104 causes the liquid crystal light valves 12 to modulate light emitted from the light source 11 to form a projection image (image light) and enlarges and projects the projection image via the projection lens 13.

The light source 11 includes a light source section 11a, which is formed, for example, of a xenon lamp, an ultrahigh-pressure mercury lamp, an LED (light emitting diode), or a laser light source, and a reflector 11b, which reduces variation in the direction of the light radiated by the light source section 11a. The light emitted from the light source 11 passes through an optical integration system that is not shown, where variation in the luminance distribution of the light is reduced, and the light is then separated by a color separation system that is not shown into color light components of red (R), green (G), and blue (B), which are three primary colors of light. The RGB color light components are incident on the respective liquid crystal light valves 12R, 12G, and 12B.

The liquid crystal light valves 12 are each formed, for example, of a liquid crystal panel in which a pair of transparent substrates encapsulate a liquid crystal material. A rectangular image area 12a, which is formed of a plurality of pixels 12p arranged in a matrix, is formed in each of the liquid crystal light valves 12, and drive voltage for each of the pixels 12p is applicable to the liquid crystal material. The light valve driver 14 applies drive voltage according to the image signal inputted from the image processing section 106 to each of the pixels 12p, and the pixel 12p has light transmittance set in accordance with the image signal. The light emitted from the light source 11 is therefore modulated when passing through the pixel area 12a to form an image according to the image signal on a color basis.

The color images are combined with one another by a light combining system that is not shown on a pixel basis or for each of the pixels 12p into projection image light (projection image 3), which is color image light (color image). The projection image light (projection image 3) is enlarged and projected by the projection lens 13 onto the projection surface 2.

Referring back to FIG. 4, the imaging section 105 captures an image of the projection surface 2 to produce a captured image.

Figure 8:
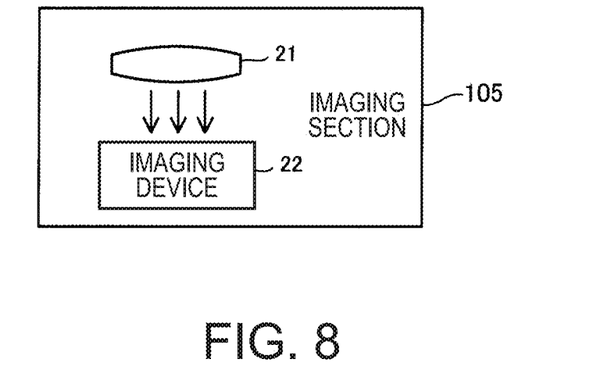
FIG. 8 shows an example of an imaging section.

FIG. 8 shows an example of the imaging section 105. The imaging section 105 is a camera including an optical system 21, which is formed of a lens and other components, an imaging device 22, which converts light collected by the optical system 21 into an electrical signal, and other components. The imaging device 22 is, for example, a CCD (charge coupled device) image sensor or a CMOS (complementary metal oxide semiconductor) image sensor. The imaging section 105 repeatedly captures an image of the projection surface 2 to produce time-series captured images.

Referring back to FIG. 4, the detection section 108 detects a change in the position of each of the icons 31 to 33 on the captured images on the basis of the captured images. The principle in accordance with which the position of each of the icons 31 to 33 changes on the captures images has been already described with reference to FIG. 2.

The processing section 109 performs a function (process) related to an icon having changed in terms of position on the basis of a result of the detection performed by the detection section 108. Specifically, when the position of any one of the plurality of markers 31 to 33 changes, the processing section 109 performs a function corresponding to the marker having changed in terms of position as a predetermined process.

For example, in a case where the icon 31 is related to a scroll function of scrolling the image 30, and when the icon 31 is operated so that the position of the icon 31 on the captured images changes, the processing section 109 carries out the process of outputting a scroll instruction to the PC 4. The PC 4 scrolls the image 30 in response to the scroll instruction.

In a case where the icon 32 is related to the function of increasing the brightness of the projection image 3, and when the icon 32 is operated so that the position of the icon 32 on the captured images changes, the processing section 109 carries out the process of outputting an instruction of increase in the brightness of the projection image 3 to the image processing section 106. The image processing section 106 increases the luminance value in the image signal according to the projection image 3 in response to the instruction of increase in the brightness of the projection image 3.

The calibration execution section 110 executes calibration that establishes correspondence between the position of each of the captured images that are each produced by capturing the projection image 3 displayed on the projection surface 2 and the position of the projection image 3 based on the image information. In the present embodiment, the calibration execution section 110, when it accepts the calibration start instruction from the accepting section 101, executes the calibration and outputs a result of the calibration to the detection section 108.

The detection section 108 estimates the positions of the icons 31 to 33 on the captures images on the basis of the result of the calibration. The detection section 108 then searches areas around the estimated positions to identify the positions of the icons 31 to 33 on the successively inputted captured images and detects a change in each of the positions.

The action of the projector 1 will then be described.

The calibration will first be described. In the present embodiment, the storage section 102 stores calibration image information representing an image for the calibration. Specifically, the storage section 102 stores first calibration image information and second calibration image information.

Figure 9:
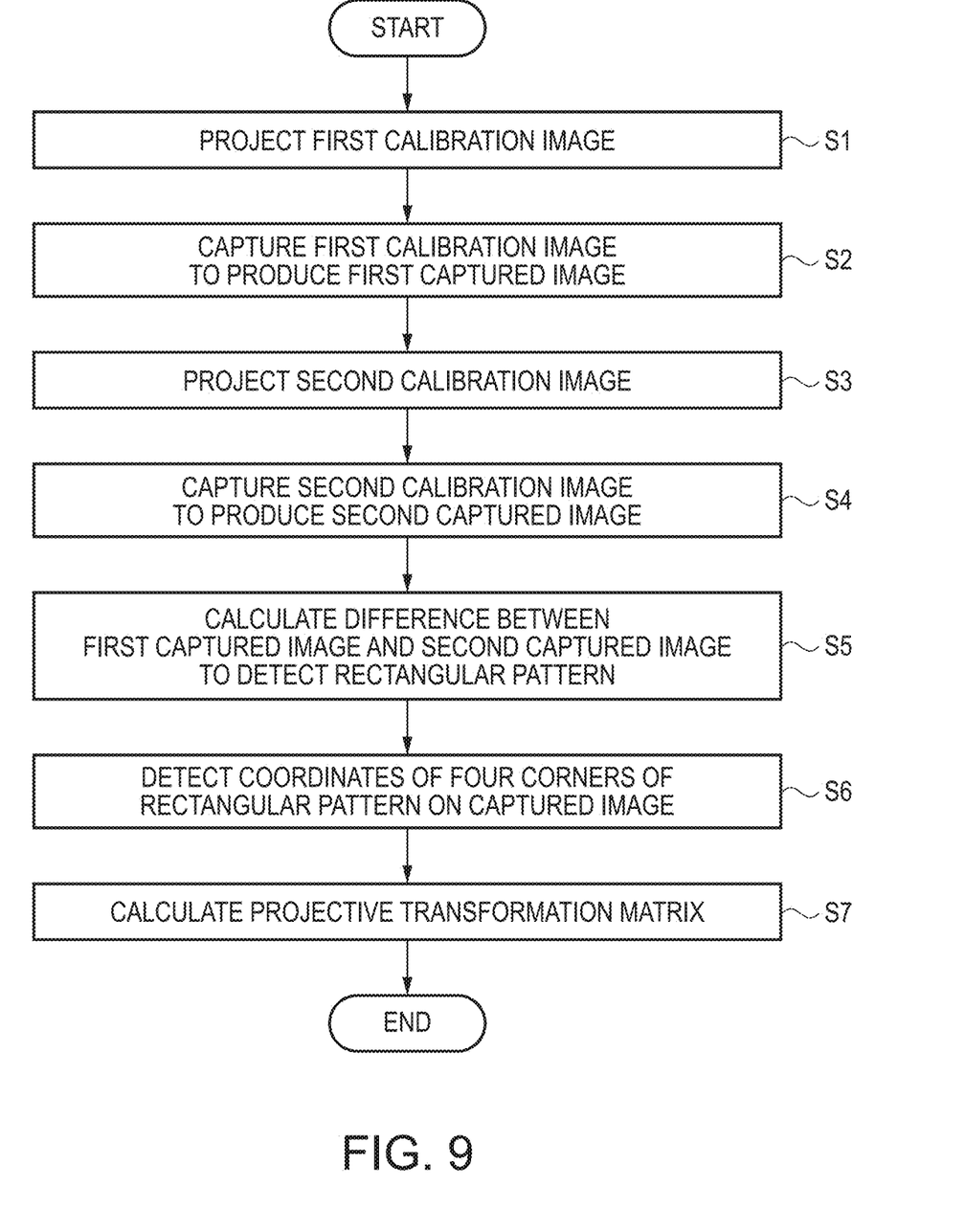
FIG. 9 is a flowchart for describing calibration.

FIG. 9 is a flowchart for describing the calibration.

The accepting section 101, when it accepts the power-on operation or the calibration start operation, outputs the calibration start instruction to the calibration execution section 110. Having accepted the calibration start instruction, the calibration execution section 110 reads the first calibration image information from the storage section 102 and outputs the first calibration image information to the image processing section 106. The image processing section 106 produces an image signal according to the first calibration image information, and the projection section 104 projects a first calibration image according to the image signal onto the projection surface 2 (step S1).

Figure 10:
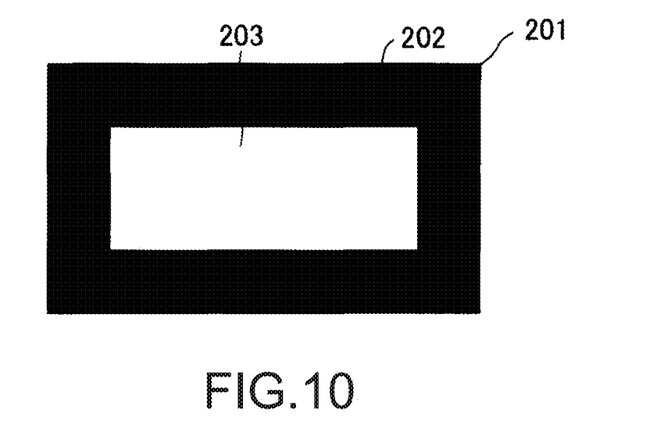
FIG. 10 shows an example of a first calibration image.

FIG. 10 shows an example of a first calibration image 201. In the first calibration image 201, a white rectangular pattern 203 is superimposed on a black background 202.

The imaging section 105 subsequently captures the first calibration image 201 displayed in the projection surface 2 to produce a first captured image (step S2). The imaging section 105 outputs the first captured image to the calibration execution section 110.

Having accepted the first captured image, the calibration execution section 110 reads the second calibration image information from the storage section 102 and outputs the second calibration image information to the image processing section 106. The image processing section 106 produces an image signal according to the second calibration image information, and the projection section 104 projects a second calibration image according to the image signal onto the projection surface 2 (step S3).

Figure 11:
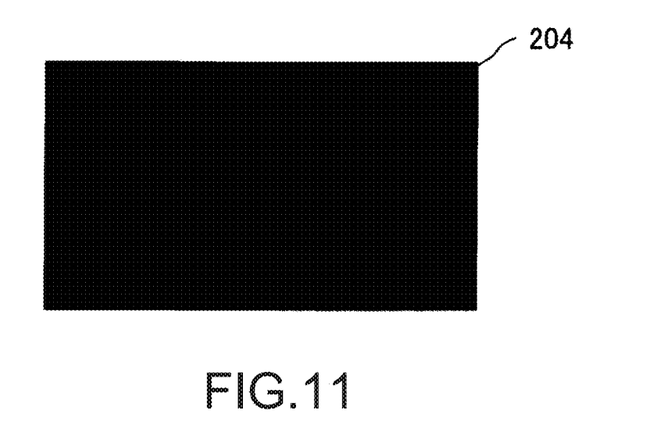
FIG. 11 shows an example of a second calibration image.

FIG. 11 shows an example of a second calibration image 204. The second calibration image 204 is an entirely black image.

The imaging section 105 subsequently captures the second calibration image 204 displayed on the projection surface 2 to produce a second captured image (step S4). The imaging section 105 outputs the second captured image to the calibration execution section 110.

Having accepted the second calibration image, the calibration execution section 110 calculates the difference between the first captured image and the second captured image to detect the rectangular pattern 203 (step S5). The calibration execution section 110 subsequently detects the coordinates of the four corners of the rectangular pattern 203 on the captured image (step S6).

The calibration execution section 110 subsequently calculates a projective transformation matrix on the basis of the positional relationship between the coordinates of the four corners of the rectangular pattern 203 identified by the first calibration image information (coordinates of four corners of rectangular pattern 203 on liquid crystal light valves 12 shown in FIG. 7) and the coordinates of the four corners of the rectangular pattern 203 in the captured image (step S7). The projective transformation matrix is a matrix for performing projective transformation in which the image on each of the liquid crystal light valves 12 is transformed into the captured image. The projective transformation matrix is an example of a result of the calibration. The calibration execution section 110 subsequently outputs the projective transformation matrix to the detection section 108.

The detection section 108, when the projective transformation matrix is inputted thereto, estimates the positions of the icons 31 to 33 in the captured images on the basis of the positions of the icons 31 to 33 in the projection image 3 based on the image information and the inputted projective transformation matrix. To detect the positions of the icons 31 to 33, the detection section 108 searches the areas around the estimated positions on the successively inputted captured images for the icons 31 to 33.

Figure 12:
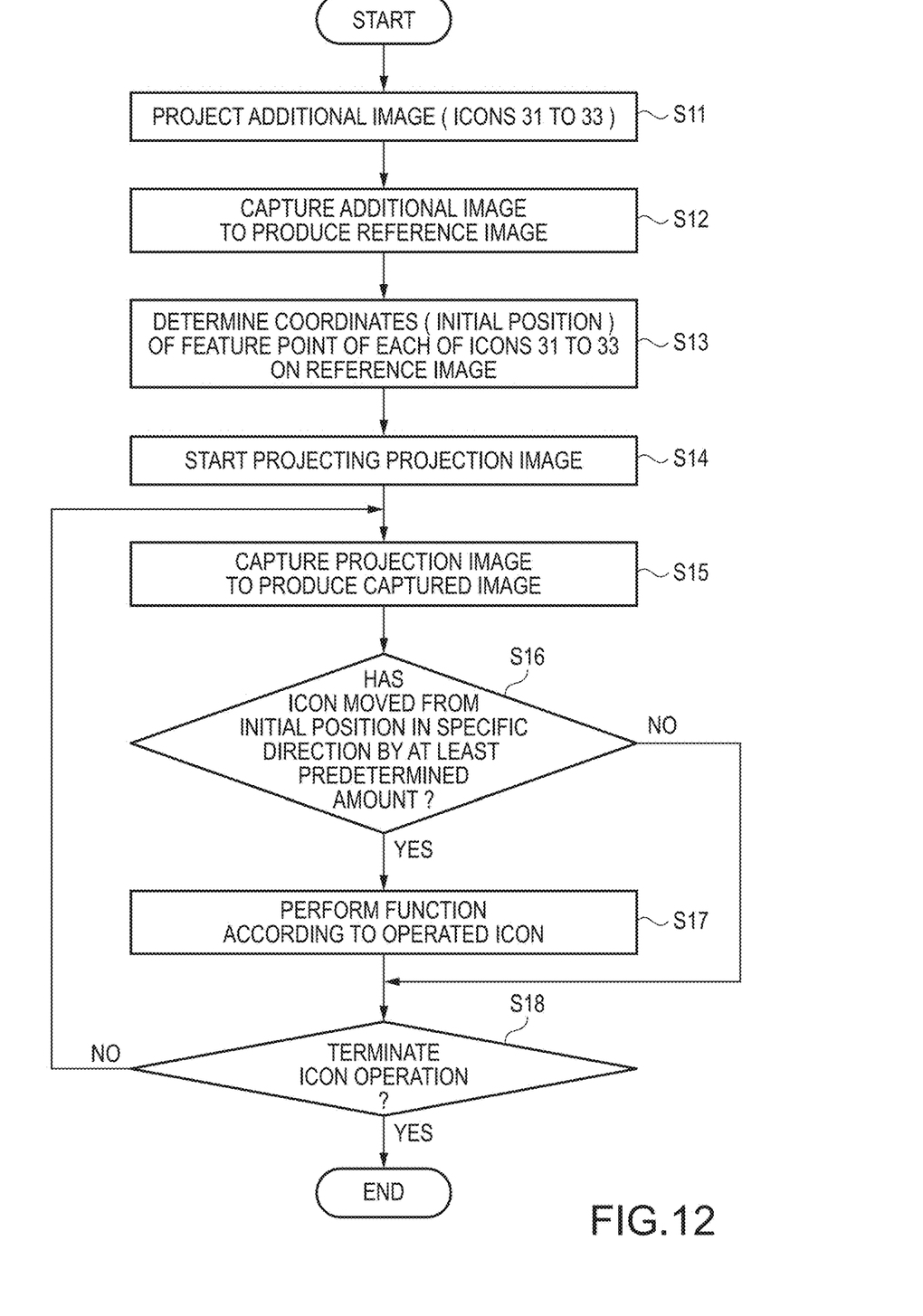
FIG. 12 is a flowchart for describing an action according to movement of an icon.

An action of performing a variety of functions on the basis of movement of the icons 31 to 33 will next be described. FIG. 12 is a flowchart for describing the action.

The accepting section 101, when it accepts the display instruction input operation, outputs the display instruction to the display control section 107. Having accepted the display instruction, the display control section 107 reads the additional image information from the storage section 102 and outputs the additional image information and a combination prohibition instruction to the image processing section 106. The combination prohibition instruction is an instruction of prohibition of combination of the additional image information with the received image information.

Having accepted the additional image information and the combination prohibition instruction, the image processing section 106 produces an image according to the additional image information. The projection section 104 projects the additional image 36 (see FIG. 5) according to the image signal onto the projection surface 2 (step S11).

The imaging section 105 subsequently captures the additional image 36 displayed on the projection surface 2 to produce a captured image (step S12). In this process, the user 5 performs no operation on the additional image 36 projected on the projection surface 2. In the following description, a captured image produced in step S12 is referred to as a "reference image." The imaging section 105 outputs the reference image to the detection section 108.

The detection section 108 uses the reference image to calculate the coordinates of a feature point (hereinafter referred to as "initial position") of each of the icons 31 to 33 on the reference image (captured image) (step S13). The feature point is, for example, the center of gravity.

Figure 13:
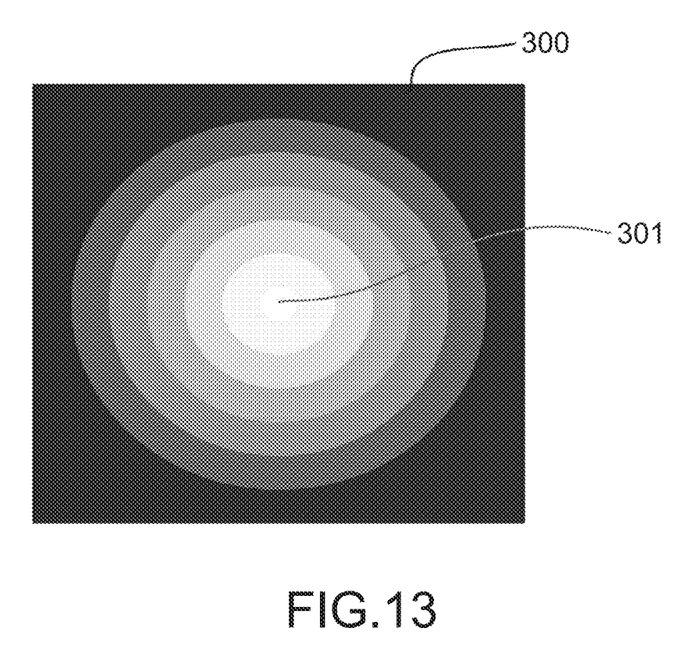
FIG. 13 shows an example of an icon.

FIG. 13 shows an example of an icon 300 usable as each of the icons 31 to 33. In the icon 300, the luminance is maximized in the position of the center of gravity 301, and the luminance decreases stepwise with distance from the position of the center of gravity 301. Using the icon 300 as each of the icons 31 to 33 therefore allows detection of the center of gravity (feature point) of the icon with accuracy.

The detection section 108 stores the initial positions in the storage section 102.

The display control section 107 subsequently outputs the additional image information and a combination instruction to the image processing section 106. Having accepted the additional image information and the combination instruction, the image processing section 106 combines the additional image information with the received image information to produce an image signal according to the projection image 3 (see FIG. 1). The projection section 104 starts projecting the projection image 3 according to the image signal onto the projection surface 2 (step S14).

The imaging section 105 subsequently captures the projection image 3 displayed on the projection surface 2 to produce a captured image (step S15). The imaging section 105 outputs the captured image to the detection section 108.

Having accepted the captured image, the detection section 108 calculates the coordinates of the feature point of each of the icons 31 to 33 on the captured image. The detection section 108 subsequently calculates the amount of movement (amount of change in position) and the moving direction of the feature point of each of the icons 31 to 33 from the initial positions stored in the storage section 102.

Subsequently, in a case where only one of the icons 31 to 33 satisfies an evaluation condition that the moving direction of the feature point is a specific direction and the amount of movement of the feature point is greater than or equal to a predetermined value (YES in step S16), the detection section 108 determines that the user 5 has operated the icon that satisfies the evaluation condition. The detection section 108 outputs the result of the evaluation to the processing section 109.

The specific direction used herein is the direction in which the optical axis of the projection section 104 and the optical axis of the imaging section 105 are shifted from each other, that is, the "direction H" (see FIGS. 2 and 3).

The evaluation condition will now be described.

The icons 31 to 33 are projected always in a fixed direction from the projection section 104. Therefore, for example, in the case where the user 5 holds the hand 5*a* in such a way that the hand 5*a* prevents the icon 31 from reaching the projection surface 2, and the projected position of the icon 31 therefore changes, the icon 31 always moves only in the specific direction H (direction in which icon 31 approaches projection lens 13) on the captured images (see FIG. 2). Therefore, in a case where the feature point moves in a direction other than the specific direction H, the feature point is likely to have moved due to a cause other than operation performed by the user 5, and the detection section 108 therefore does not interpret the movement as a result of operation performed by the user 5.

Even in a case where the user 5 has not operated any of the icons 31 to 33, the projected positions of the icons 31 to 33 slightly change in some cases, for example, because the projection surface 2, such as a screen, sways. Therefore, in a case where the amount of movement is smaller than the predetermined amount (in a case where the amount of movement is too small), the detection section 108 also does not interpret the movement as a result of operation performed by the user 5.

The processing section 109 performs a function related to the icon that satisfies the evaluation condition, that is, a function related to the icon operated by the user 5 on the basis of a result of the detection performed by the detection section 108 (step S17).

After step S17 is carried out, and in a case where the detection section 108 has detected no operation performed by the user 5 on any of the icons 31 to 33 (NO in step S16), the display control section 107 evaluates whether or not it has received the termination instruction of termination of the icon operation from the PC 4 or the accepting section 101 (step S18).

The display control section 107, when it received the termination instruction (YES in step S18), stops outputting the additional image information and the combination instruction to the image processing section 106 to terminate the display of the icons 31 to 33. In this case, the image processing section 106 produces an image signal according to the received image information, and the projection section 104 projects the image 37 (see FIG. 6) according to the image signal onto the projection surface 2.

On the other hand, in a case where the display control section 107 has received no termination instruction (NO in step S18), the control returns to the process in step S15.

The projector 1 and the method for controlling the projector 1 according to the present embodiment can be used in a situation in which the operation element, with which any of the icons 31 to 33 is operated, has a reflection characteristic similar to that of the projection surface 2 and can avoid a situation in which a predetermined process is not carried out when any of the icons 31 to 33 is operated with the operation element.

Variations

The invention is not limited to the embodiment described above, and a variety of variations, such as those described below, are conceivable. Further, one or more variations arbitrarily selected from the following aspects of variations can be combined with each other as appropriate.

Variation 1

The operation element is not limited to the hand 5*a* of the user 5 and can be changed as appropriate. For example, the operation element may instead be a palm of the user 5 or a sheet of paper.

Variation 2

The shape of each of the icons 31 to 33 is not limited to the shape of the icon 300 shown in FIG. 13 and can be changed as appropriate. For example, a circular, elliptical, polygonal, arrow-shaped, or even dot-shaped image may be used. Further, the feature point of each of the icons 31 to 33 is not limited to the center of gravity and can be changed as appropriate. For example, in a case where the icons 31 to 33 each have a polygonal shape, a vertex of the polygonal shape may be used as the feature point. The shapes of the icons 31 to 33 may differ from one another.

Variation 3

The display control section 107 displays the icons 31 to 33 in the projection image 3 along a left edge 36a out of the four edges of the projection image 3, as shown in FIGS. 1 and 5, but the icons 31 to 33 are not necessarily arranged as described above and may be arranged along another edge. It is, however, conceivable that the user moves the operation element into the projection image 3 via the right or left side thereof and operates the icons 31 to 33, and the icons 31 to 33 are therefore desirably arranged along at least one of the left edge 36a or a right edge 36b, where the user readily operates the icons 31 to 33. The left edge 36a and the right edge 36b are edges parallel to the vertical direction (upward/downward direction) y of the projection image 3. The number of icons is not limited to three and may instead be two or fewer or four or more.

Variation 4

To detect the feature point of each of the icons 31 to 33, it is preferable that the display control section 107 displays the icons 31 to 33 in white and the area around the icons 31 to 33 in black, whereby the icons 31 to 33 are readily detected. In this case, the area 36c displayed in white in the additional image 36 shown in FIG. 5 may be displayed in black.

Variation 5

The functions related to of the icons 31 to 33 are not limited to the scroll function and the function of increasing the brightness of the projection image 3 and can be changed as appropriate. For example, the function of freezing (fixing) the projection image 3, the function of disabling the projection image 3, or the function of displaying an operation menu may be employed.

Variation 6

The processing section 109 may operate as follows in addition to the action described with reference to FIG. 12: That is, in a case where the detection section 108 detects that the positions of the icons 31 to 33 have changed all at once (at the same time), the processing section 109 may not carry out the process in step S17 but may wait until the positions of the icons 31 to 33 return to the original positions to avoid wrong operation or detection.

Further, in a case where the positions of the icons 31 to 33 have changed at the same time and then remain there for at least a fixed period, the calibration may be performed again and the control may return to the process in step S11 because the positional relationship between the projector 1 and the projection surface 2 may have changed.

Variation 7

The evaluation condition is not limited to the condition in which "the moving direction of the feature point is a specific direction and the amount of movement of the feature point is greater than or equal to a predetermined value" and can be changed as appropriate. For example, the evaluation condition may instead be a condition in which "the position of the feature point has changed," a condition in which "the position of the feature point has changed in the specific direction," a condition in which "the amount of movement of the feature point is greater than the predetermined value," or any combination thereof.

Variation 8

In the case where the storage section 102 stores image information, the image processing section 106 may use the image information stored in the storage section 102 in place of the received image information.

Variation 9

The entirety or part of the elements achieved when the control section 103 executes the program may be achieved by hardware formed, for example, of an FPGA (field programmable gate array), an ASIC (application specific IC), or any other electronic circuit or may be achieved by software and hardware that cooperate with each other.

Variation 10

The projection section 104 uses liquid crystal light valves as the light modulator, and the light modulator may not be liquid crystal light valves and can be changed as appropriate. For example, a configuration using three reflective liquid crystal panels may be used. The light modulator may still instead, for example, be the combination of one liquid crystal panel and a color wheel, three digital mirror devices (DMDs), or the combination of one digital mirror device and a color wheel. In the case where only one liquid crystal panel or DMD is used as the light modulator, no members corresponding to the light separation system and the light combining system are required. Further, a configuration including no liquid crystal panel or DMD but capable of modulating light emitted from a light source can be employed as the light modulator.

The entire disclosure of Japanese Patent Application No. 2017-033042, filed Feb. 24, 2017 is expressly incorporated by reference herein.

What is claimed is:

1. A projector comprising:
   an image projector that projects a projection image on a projection surface;
   a camera that captures an image of the projection surface to produce a captured image; and
   a processor programmed to:
      instruct the image projector to display a plurality of markers in the projection image;
      detect a change in position of one or more of the plurality of markers in a direction in which an optical axis of the image projector and an optical axis of the camera are shifted from each other, based on the captured image;
      in a case where the position of one of the plurality of markers changes, perform a process corresponding to the one marker having changed position; and
      in a case where the positions of more than one of the plurality of markers change simultaneously, not perform the process.

2. The projector according to claim 1, wherein the processor is programmed to instruct the image projector to display the plurality of markers vertically along an edge of the projection image.

3. The projector according to claim 1, wherein the processor is programmed to, in a case where the position of the one marker changes by an amount greater than a predetermined amount, perform the process.

4. The projector according to claim 1, wherein
   the captured image contains the plurality of markers projected on the projection surface, the camera captures a second image of the plurality of markers projected on an operation element to produce a second captured image, and the processor is programmed to detect the change in the position of the one or more of the plurality of markers based on the captured image and the second captured image.

5. The projector according to claim 4, wherein the processor is programmed to:

calculate first coordinates of a feature point of the one marker based on the capture image;

calculate second coordinates of the feature point based on the second captured image; and in a case an amount of movement of the second coordinates from the first coordinates is greater than or equal to a predetermined value, perform the process.

6. The projector according to claim 1, wherein the plurality of markers are marker images.

7. A method for controlling a projector, the method comprising:

projecting, using an image projector, a projection image on a projection surface;

displaying a plurality of markers in the projection image;

capturing, using a camera, an image of the projection surface to produce a captured image;

detecting a change in position of one or more of the plurality of markers in a direction in which an optical axis of the image projector and an optical axis of the camera are shifted from each other, based on the captured image;

in a case where the position of one of the plurality of markers changes, performing a process corresponding to the one marker having changed position; and in a case where the positions of more than one of the plurality of markers change simultaneously, not performing the process.

* * * * *